United States Patent
Kruchowski et al.

(10) Patent No.: US 8,540,434 B2
(45) Date of Patent: Sep. 24, 2013

(54) OPTICAL EDGE CONNECTOR

(75) Inventors: James N. Kruchowski, Rochester, MN (US); Vladimir Sokolov, Rocheser, MN (US); Mark A. Nelson, Oronoco, MN (US)

(73) Assignee: MAYO Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 13/143,997

(22) PCT Filed: Jan. 15, 2010

(86) PCT No.: PCT/US2010/021247
§ 371 (c)(1),
(2), (4) Date: Jul. 11, 2011

(87) PCT Pub. No.: WO2010/123595
PCT Pub. Date: Oct. 28, 2010

(65) Prior Publication Data
US 2011/0274394 A1    Nov. 10, 2011

Related U.S. Application Data

(60) Provisional application No. 61/145,046, filed on Jan. 15, 2009.

(51) Int. Cl.
G02B 6/38 (2006.01)
G02B 6/26 (2006.01)
G02B 6/10 (2006.01)

(52) U.S. Cl.
USPC .......... 385/56; 385/39; 385/50; 385/53; 385/55; 385/129

(58) Field of Classification Search
USPC ........ 385/36, 39, 50, 52, 53, 55, 56, 59, 385/74, 71, 92, 93, 114, 129, 147
See application file for complete search history.

(56) References Cited

U.S. PATENT DOCUMENTS

| | | | |
|---|---|---|---|
| 6,463,197 B1 | 10/2002 | Dragone | |
| 7,209,621 B2* | 4/2007 | Glebov et al. | 385/129 |
| 2002/0085812 A1* | 7/2002 | Booth et al. | 385/50 |
| 2002/0097962 A1* | 7/2002 | Yoshimura et al. | 385/50 |
| 2003/0091290 A1 | 5/2003 | Whitehead | |
| 2005/0226561 A1 | 10/2005 | Romagnoli et al. | |
| 2007/0062221 A1 | 3/2007 | Ishida et al. | |

OTHER PUBLICATIONS

International Search Report and Written Opinion as mailed on Sep. 29, 2010 for International Application No. PCT/US2010/021247.

* cited by examiner

*Primary Examiner* — Kaveh Kianni
*Assistant Examiner* — Hung Lam
(74) *Attorney, Agent, or Firm* — Quarles & Brady, LLP

(57) ABSTRACT

A connector assembly for optically coupling a first optical device mounted on a first substrate to a second optical device mounted on a second substrate, where the first and second substrates are orthogonally oriented to each other, is presented. The connector assembly includes two connectors. The first connector has an optical waveguide array. The optical waveguide array further includes multiple parallel optical waveguides that are continuously redirected by a mirror oriented at a 45 degree angle to the optical waveguides. Likewise, the second connector also has an optical waveguide array further include multiple parallel optical waveguides continuously redirected by a mirror oriented at a 45 degree angle to the optical waveguides. The first connector is oriented orthogonally to the second connector and the first and second connectors are optically welded together in a back-to-back configuration.

10 Claims, 3 Drawing Sheets

OPTICAL EDGE CONNECTOR

CROSS-REFERENCE TO RELATED APPLICATIONS

This application is based on provisional application Ser. No. 61/145,046, filed Jan. 15, 2009, and entitled "OPTICAL EDGE CONNECTOR," and is a national phase of International Application No. PCT/US2010/021247 filed on Jan. 15, 2010, and claims the benefit thereof.

STATEMENT REGARDING FEDERALLY SPONSORED RESEARCH This invention was made with government support under 904-03-C-1400 awarded by the U.S. Department of Defense-Defense Advanced Research Projects. The government has certain rights in the invention.

STATEMENT CONCERNING FEDERALLY SPONSORED RESEARCH OR DEVELOPMENT

This invention was made with government support under 904-03-C-1400 awarded by the Missile Defense Agency. The government has certain rights in the invention.

BACKGROUND OF THE INVENTION

The present invention relates generally to optical edge connectors, and more particularly to optically coupling optical devices mounted on planar substrates oriented orthogonally to each other.

The desirability of using optical systems in high-volume, high-speed signal communication environments is well established despite not being used industry wide. Advances made in processor technology to increase clock speed and data throughput also entails substantially greater bandwidth demands on intra-system communication systems. Thus, further system development is needed to meet the demands of computationally-intensive applications.

Typically, a system having multiple computing components is mounted in a cabinet structure including a box having multiple internal slots. Within the cabinet, components are mounted on printed circuit boards (PCBs); each PCB including a planar substrate having pathways coupling components together. In optical systems, these pathways are waveguides that direct optical signals. Together, the PCBs in the cabinet define intersecting planes orthogonal to a backplane, which may or may not be another PCB.

When optical PCBs are employed, there is the need to optically couple components on intersecting boards, which requires a system for causing an optical signal to "turn a corner." FIG. 1a illustrates this need where PCB A and PCB B are connected in a conventional backplane orientation to backplane 100. One type of optical edge connector 102 suitable for this configuration can be seen in both FIG. 1a and FIG. 1b. For the purpose of the present description, the y-axis is defined by the longitudinal axis of the PCBs. Thus, in backplane orientations generally, the longitudinal axis is collinear with the insertion axis of the PCBs into the cabinet and the axis of connection of the optical fibers in and out of the cabinets. The x-axis is defined by the axis of connection of the optical fibers on the backplane, shown in FIG. 1b as a second PCB 104. The intersection of the two planes defines a transverse z-axis. Thus, the x and y-axes are perpendicular to each other and are orthogonal to the z-axis.

The optical edge connector 102 provides a system to interconnect the optical fibers in the backplane, here PCB 104, with the optical fibers of PCB 106 using an optical waveguide array 108, thereby coupling optical devices (not shown). The waveguide array 108 includes multiple two-dimensionally integrated cores 109, with each integrated core 109 including a vertical core 119 and a horizontal core 129, the integrated cores being redirected by a mirror 110 positioned at a 45 degree angle to the surface of PCB 104. Thus, optical signals inputted from the optical fibers of PCB 104 are redirected 90 degrees from vertical cores 119 to horizontal cores 129 positioned parallel to the longitudinal axis of PCB 104.

However, for system designs placing a high premium on packaging density and achieving minimum source-to-destination propagation delay times, optical edge connector 102 is insufficient. It is well known that the packaging density is physically limited by the thickness of the components attached to the PCBs. Yet it is also known that, the closer the components can be placed together, the lower the latency in communication. By being limited to the conventional backplane configuration, system designs attempting to minimize the distance between a maximum density of components are thus hampered by the thickness of each component.

Thus, there is a need for an optical edge connector capable of connecting hybrid PCBs oriented in configurations that reduce packaging density and achieve a reduction in source to destination propagation delay times.

SUMMARY OF THE INVENTION

The present invention overcomes the aforementioned drawbacks by providing a system and method for optically coupling PCBs in various orientations without the need for large packaging systems or injecting undue propagation delays. In particular, the present invention optically couples optical devices mounted on planar substrates oriented orthogonally to each other.

In accordance with one aspect of the invention, a connector assembly is disclosed for optically coupling a first optical device mounted on a first substrate to a second optical device mounted on a second substrate, where the first and second substrates are orthogonally oriented to each other. The connector assembly includes two connectors. The first connector has an optical waveguide array. The optical waveguide array further includes multiple parallel optical waveguides that are continuously redirected by a mirror oriented at a 45 degree angle to the optical waveguides. Likewise, the second connector also has an optical waveguide array further including multiple parallel optical waveguides continuously redirected by a mirror oriented at a 45 degree angle to the optical waveguides. The first connector is oriented orthogonally to the second connector and the first and second connectors are optically welded together in a back-to-back configuration.

In some aspects of the invention, each one of the first plurality of horizontal waveguides is optically welded to a corresponding each one of the second plurality of horizontal waveguides.

In other aspects of the invention, the first plurality of parallel optical waveguides comprises a first plurality of vertical waveguides and a first plurality of horizontal waveguides, and the second plurality of parallel optical waveguides comprises a second plurality of vertical waveguides and a second plurality of horizontal waveguides. Each one of the first plurality of horizontal waveguides may be optically welded to the corresponding each one of the second plurality of horizontal waveguides.

In another aspect of the invention, the first connector includes a first substrate connection surface and the second connector includes a second substrate connection surface, the first substrate connection surface being oriented in an X-Z plane, and the second substrate connection surface oriented in an X-Y plane.

In accordance with another aspect of the invention, a connector is disclosed for optically coupling a first optical device mounted on a first substrate to a second optical device mounted on an orthogonally intersecting second substrate. The connector assembly includes a first optical connection surface configured to optically couple to the first substrate and a second optical connection surface configured to optically couple to the second substrate, the second substrate orthogonally intersecting with the first substrate. A plurality of parallel optical waveguides have a first end and a second end, the plurality of parallel optical waveguides being positioned between a first mirror oriented at a 45 degree angle to the plurality of parallel optical waveguides and a second mirror oriented at a 45 degree angle to the plurality of parallel optical waveguides. The first mirror continuously redirects the plurality of parallel optical waveguides by 90 degrees at the first end and the second mirror continuously redirects the plurality of parallel optical waveguides by 90 degrees at the second end.

In some aspects of the invention, the first optical connection surface is oriented in an X-Z plane and the second optical connection surface is oriented in an X-Y plane.

In other aspects of the invention, the plurality of parallel optical waveguides includes a plurality of horizontal waveguides and a plurality of vertical waveguides. The first mirror continuously redirects the first end of the plurality of horizontal waveguides by 90 degrees to the plurality of vertical waveguides, and the second mirror continuously redirects the second end of the plurality of horizontal waveguides by 90 degrees to the plurality of vertical waveguides. The plurality of vertical waveguides includes a plurality of first vertical waveguides redirected by the first mirror and a plurality of second vertical waveguides redirected by the second mirror.

BRIEF DESCRIPTION OF THE DRAWINGS

The present invention will become more apparent from the detailed description set forth below when taken in conjunction with the drawings, in which like elements bear like reference numerals.

DETAILED DESCRIPTION

Figure 1A:
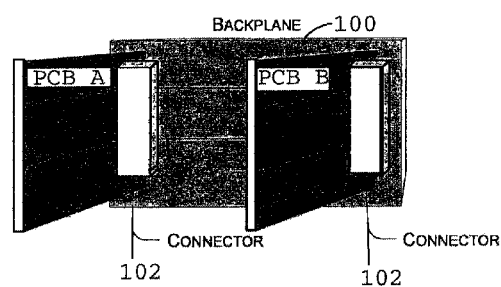
FIGS. 1a and 1b illustrate an example of an optical connector for connecting two optical printed circuit boards (PCBs) in a conventional backplane orientation.
Figure 1B:
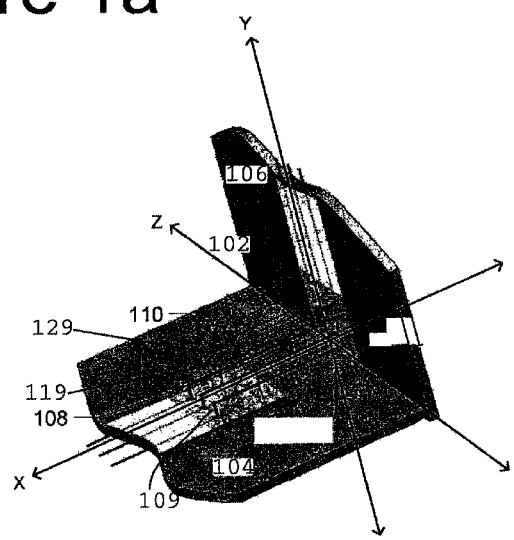
Figure 2:
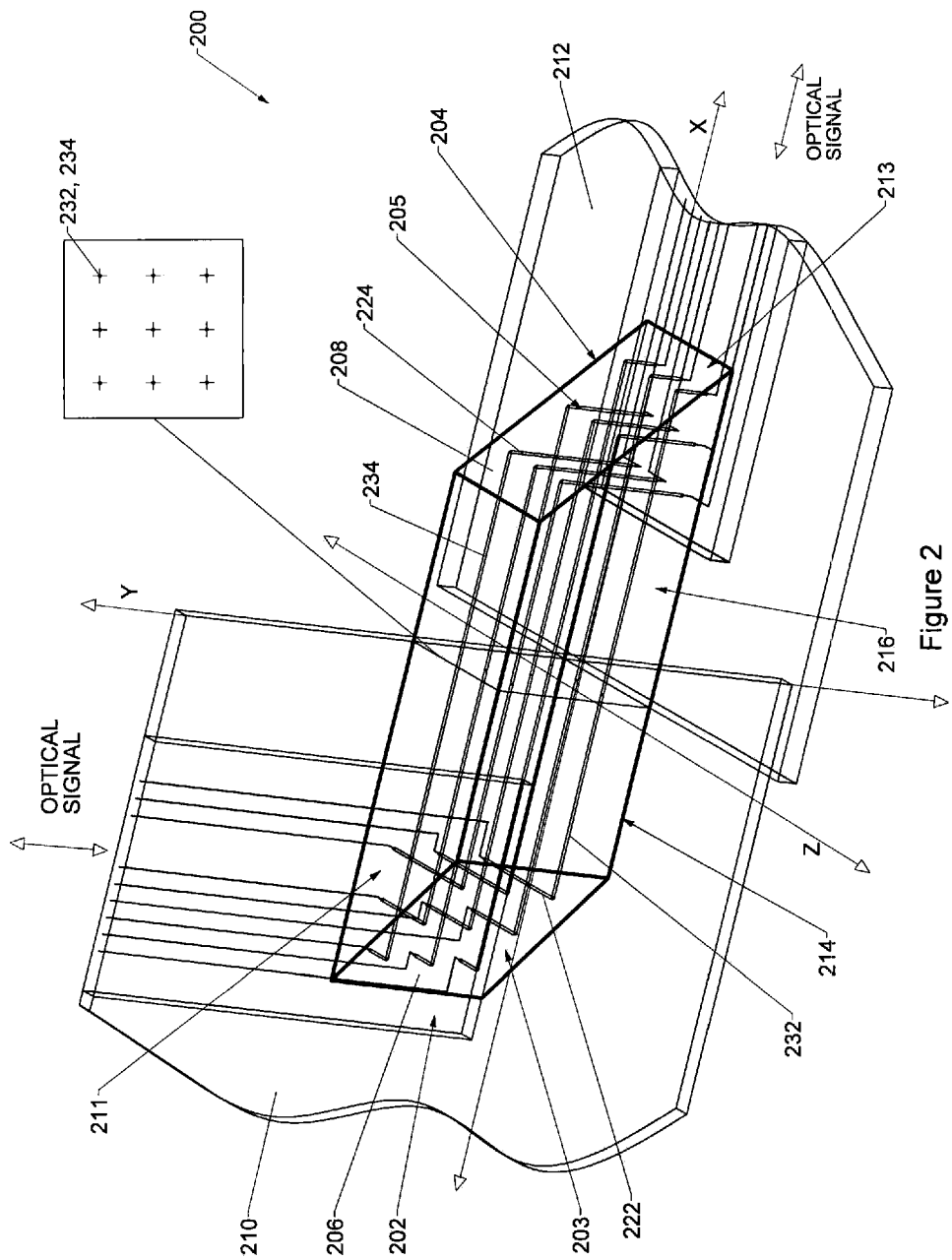
FIG. 2 illustrates one configuration of an exemplary optical edge connector for two optical PCBs in an orthogonal backplane orientation in accordance with the present invention.

The present discussion considers the design of an optical edge connector for planar substrates having orthogonal orientations. Specifically, FIG. 2 illustrates an exemplary optical edge connector 200 designed to interconnect a first optical waveguide array 202 and a second optical waveguide array 204. In the exemplary embodiment shown, a first planar substrate is oriented in an X-Z plane, and a second planar substrate is oriented in an X-Y plane. In one configuration, the first and second optical waveguide arrays are optical buses that optically couple to optical devices (not shown). By way of example, and not by way of limitation, the optical devices may include additional optical waveguides, light-emitting diodes, laser sources, optical receptors, and opto-electronic devices.

The first optical waveguide array 202 includes multiple two-dimensionally integrated cores or parallel waveguides 203, with each integrated core 203 including a vertical core 222 and a horizontal core 232. The integrated cores are continuously redirected by a mirror 206 positioned at a 45 degree angle to the surface of a planar substrate 210, here illustrated as a PCB. Optical signals input from the vertical cores 222 are thus successively redirected at mirror 206 and propagated through the horizontal cores 232, the horizontal cores being parallel to the longitudinal axis of planar substrate 210.

The second optical waveguide array 204 includes a corresponding number of integrated cores or parallel waveguides 205 to the first optical waveguide array 202 as well as a mirror 208 positioned at a 45 degree angle. Each integrated core 205 includes a vertical core 224 and a horizontal core 234. Likewise, optical signals imputed from the vertical cores 224 are successively redirected by mirror 208 and propagated through the horizontal cores 234 parallel to a planar substrate 212. The horizontal cores 234 are positioned such that they align with the horizontal cores 232 of the first optical waveguide array 202 when the first and second optical waveguide arrays 202, 204 are placed back-to-back.

The exemplary optical edge connector 200 includes a first connector 214 and a second connector 216. The first connector 214 includes the first optical waveguide array 202 and is mounted to planar substrate 210 at the first connection surface 211, the longitudinal alignment of the first connector 214 defining an x-axis. Similarly, the second connector 216 includes the second optical waveguide array 204 and is mounted to planar substrate 212 at the second connection surface 213, the longitudinal alignment of the second connector defining a y-axis. From this, a z-axis can be defined and the horizontal cores of the first and second optical waveguides thus connect at a y-z plane.

Optical signals, input from planar substrate 210 and traveling parallel to the z-axis, propagate through the vertical cores 222 and are successively redirected 90 degrees by mirror 206 to the horizontal cores 232 of the first optical waveguide array 202 positioned parallel to the x-axis. The optical signals propagate into the horizontal cores 234 of the second optical waveguide array 204, also being parallel to the x-axis. The optical signals are further redirected 90 degrees by mirror 208 and propagated along the vertical cores 224, eventually outputting from planar substrate 212 parallel to the x-axis. Those of ordinary skill will understand that, although the present discussion describes the optical signals entering the optical edge connector 200 from planar substrate 210 and exiting via planar substrate 212, in practice, optical signals may propagate in either direction through optical edge connector 200. Thus, optical edge connector 200 is capable of connecting two substrates in an orthogonal backplane orientation.

Figure 3:
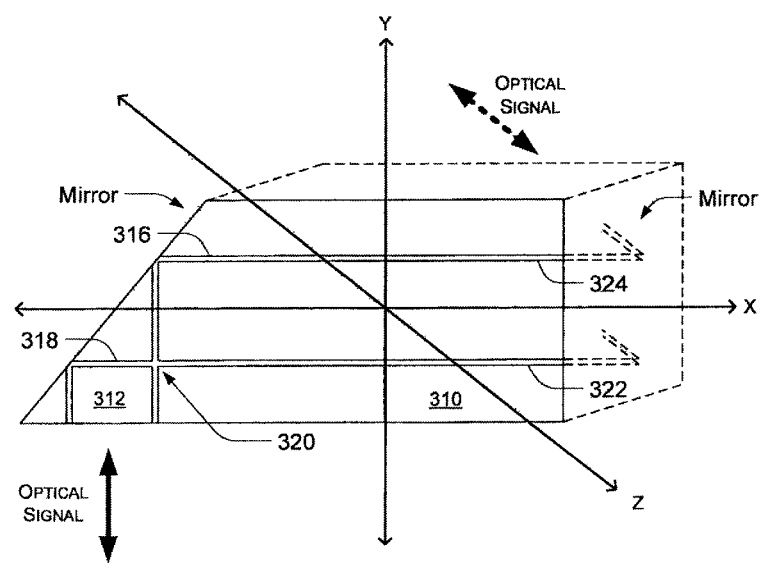
FIG. 3 presents a cross-sectional illustration of a three-dimensional optical waveguide array of the exemplary optical edge connector of FIG. 2.

An x-y cross-section of the optical edge connector 200 of FIG. 2 is illustrated as FIG. 3. In the present configuration, the optical cores 316 and 318 of the first connector 312 are the same length and intersect at cross point 320. Likewise, optical cores 322 and 324 of the second connector 310 are the same length and intersect at a cross point (not shown). Optical cores 316 and 318 meet optical cores 324 and 322 at the y-axis. This configuration suppresses any potential modulation skew.

As will be understood by a person of ordinary skill in the art, connectors 310 and 312 each have the same n×n array of optical cores. Therefore, in an orthogonal configuration, the optical cores of connector 312 align with the optical cores of connector 310.

Three dimensional optical waveguides, such as those discussed in reference to FIGS. 2 and 3 can be manufactured using a wafer stack process. The planar waveguide arrays can be fabricated with epoxy resin in the shape of a grid pattern on a glass wafer using conventional spin-coating, baking, and dry-etching processes. Several of the glass wafers can then be stacked and laminated to each other using epoxy resin.

The glass wafers are next diced at the cross point of the cores at 45 degrees. The diced surface is then applied to a mirror to redirect the optical paths by 90 degrees as previously discussed. In further embodiments, to enhance reflective efficiency the diced surface may also be polished and coated with a multilayer $SiO_2$—$MgF_2$ film prior to attaching to the mirror. The mirrored surface is then protected by attaching a glass block to the waveguide array.

The resulting fabricated optical waveguide connectors can be optically welded together back-to-back, forming the optical edge connector previously described. Finally, the optical edge connector can be mounted to substrates, such as PCBs, having an orthogonal backplane orientation using a flip-chip bonder.

Those skilled in the art will appreciate that the embodiments disclosed herein may be used when coupling a variety of optical devices. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A connector assembly configured for optically coupling a first optical device mounted on a first substrate to a second optical device mounted on an orthogonally intersecting second substrate, the connector assembly comprising:
    a first connector comprising a substantially flat first backside and a first mirror side, the substantially flat first backside and the first mirror side being on opposite sides of the first connector, the first connector having a first optical waveguide array comprising a first plurality of parallel optical waveguides and a first mirror on the first mirror side, the first mirror oriented at a 45 degree angle to the first plurality of parallel optical waveguides, wherein the first mirror continuously redirects the first plurality of parallel optical waveguides by 90 degrees;
    a second connector comprising a substantially flat second backside and a second mirror side, the substantially flat second backside and the second mirror side being on opposite sides of the second connector, the second connector having a second optical waveguide array comprising a second plurality of parallel optical waveguides and a second mirror on the second mirror side, the second mirror oriented at a 45 degrees angle to the second plurality of parallel optical waveguides, wherein the second mirror continuously redirects the second plurality of parallel optical waveguides by 90 degrees;
    wherein the first substrate is in an X-Z plane and the second substrate is in an X-Y plane, the first substrate including a first edge and the second substrate including a second edge, such that the first edge intersects the second edge in a Y-Z plane; and
    wherein the first connector is orthogonally oriented to the second connector and wherein the substantially flat first backside of the first connector is optically welded in the Y-Z plane to the substantially flat backside of the second connector.

2. The connector assembly according to claim 1:
    wherein each one of the first plurality of parallel optical waveguides is optically welded to a corresponding each one of the second plurality of parallel optical waveguides.

3. The connector assembly according to claim 1:
    wherein the first plurality of parallel optical waveguides comprises a first plurality of vertical waveguides and a first plurality of horizontal waveguides; and
    the second plurality of parallel optical waveguides comprises a second plurality of vertical waveguides and a second plurality of horizontal waveguides.

4. The connector assembly according to claim 3:
    wherein each one of the first plurality of horizontal waveguides is optically welded to the corresponding each one of the second plurality of horizontal waveguides.

5. The connector assembly according to claim 1:
    wherein the first connector includes a first substrate connection surface and the second connector includes a second substrate connection surface, the first substrate connection surface being oriented in the X-Z plane, and the second substrate connection surface oriented in the X-Y plane.

6. A connector for optically coupling a first optical device mounted on a first substrate to a second optical device mounted on an orthogonally intersecting second substrate, the connector assembly comprising:
    a first connector comprising a substantially flat first backside, a first mirror side, and a first optical connection surface configured to optically couple to the first substrate, the substantially flat first backside and the first mirror side being on opposite sides of the first connector;
    a second connector comprising a substantially flat second backside, a second mirror side, and a second optical connection surface configured to optically couple to the second substrate, the substantially flat second backside and the second mirror side being on opposite sides of the second connector, the second substrate orthogonally intersecting with the first substrate, the first substrate being in an X-Z plane and the second substrate being in an X-Y plane, the first substrate including a first edge and the second substrate including a second edge, such that the first edge intersects the second edge in a Y-Z plane and the substantially flat first backside intersects the substantially flat second backside in the Y-Z plane;
    a plurality of parallel optical waveguides having a first end and a second end, the plurality of parallel optical waveguides positioned between a first mirror on the first mirror side oriented at a 45 degree angle to the plurality of parallel optical waveguides and a second mirror on the second mirror side oriented at a 45 degree angle to the plurality of parallel optical waveguides; and
    wherein the first mirror continuously redirects the plurality of parallel optical waveguides by 90 degrees at the first end and the second mirror continuously redirects the plurality of parallel optical waveguides by 90 degrees at the second end.

7. The connector according to claim 6:
    wherein the first optical connection surface is oriented in the X-Z plane and the second optical connection surface is oriented in the X-Y plane.

8. The connector according to claim 6:
wherein the plurality of parallel optical waveguides comprises a plurality of horizontal waveguides and a plurality of vertical waveguides.

9. The connector according to claim 8:
wherein the first mirror continuously redirects the first end of the plurality of horizontal waveguides by 90 degrees to the plurality of vertical waveguides, and the second mirror continuously redirects the second end of the plurality of horizontal waveguides by 90 degrees to the plurality of vertical waveguides.

10. The connector according to claim 9:
wherein the plurality of vertical waveguides comprises a plurality of first vertical waveguides redirected by the first mirror and a plurality of second vertical waveguides redirected by the second mirror.

* * * * *